A. BERGSTROM.
Assignor of part interest, to W. J. FENDER, W. L. BASSETT, and S. B. CHASE.
Piston Water-Meter.
No. 8,120. Reissued March 12, 1878.
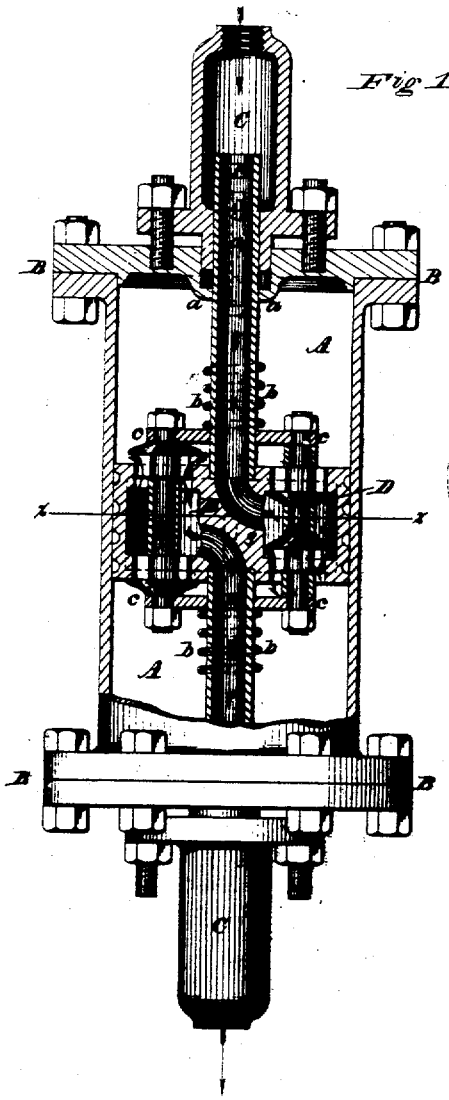
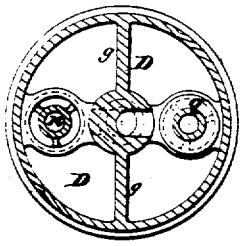
*Witnesses.*
Harry King
Wm. Blackstock.
*Inventor.*
Andrew Bergstrom
By Hill Ellsworth
His Attys.
N. PETERS, PHOTO-LITHOGRAPHER, WASHINGTON, D. C.

UNITED STATES PATENT OFFICE.

ANDREW BERGSTROM, OF MINNEAPOLIS, MINNESOTA, ASSIGNOR OF PART INTEREST TO WILLIAM J. FENDER, WILLIAM L. BASSETT, AND SYLVESTER B. CHASE.

IMPROVEMENT IN PISTON WATER-METERS.

Specification forming part of Letters Patent No. 173,579, dated February 15, 1876; Reissue No. 8,120, dated March 12, 1878; application filed January 17, 1878.

*To all whom it may concern:*

Be it known that I, ANDREW BERGSTROM, of Minneapolis, in the county of Hennepin and State of Minnesota, have invented a new and Improved Piston Water-Meter; and I do hereby declare the following to be a full and exact description of the same, reference being had to the accompanying drawings, forming a part of this specification, in which—

Figure 1 is a longitudinal section of the meter, and Fig. 2 a transverse section taken in the plane of the line *x x*, Fig. 1.

Similar letters of reference in the several figures denote the same parts.

My invention has for its object to simplify and improve the construction and operation of piston water-meters of that class in which the piston, reciprocating within the cylinder by the action or flow of water, is divided into two separate chambers, each provided with suitable valves, and communicating with two hollow piston-rods, one of which, for the water-supply, is adapted to slide through one head of the cylinder, and the other to slide through the opposite head of the cylinder to discharge the water from the meter, the valves being set or shifted by contact with the heads of the cylinder at each stroke of the piston. The principal objection to the successful operation of this class of meters arises from the fact that under a light pressure or very small flow of water the movement of the piston shifts the valves so slowly that when they are partly opened the water will flow into the cylinder upon both sides of the piston simultaneously, thus balancing the pressure and stopping the piston before the valves are seated.

To obviate this objection, my invention consists in combining suitable springs or elastic cushions with the piston-valves, for the purpose of adjusting or setting them at each end of the stroke with a certainty of action.

It also consists in connecting the two sets of valves by suitable means to insure their simultaneous movement in the piston.

It also consists in certain details of construction, as I will presently describe.

In the accompanying drawings, A represents the cylinder of my improved meter, to the flanged upper ends of which the covers B, provided each with a central opening, are securely bolted. C is a stuffing-box provided with a flange at its lower end, by means of which it is bolted to the upper cover B, as shown in the drawing. D is a hollow piston, divided by the diaphragm (see Fig. 2) into two compartments, one of which opens into the hollow piston-rod E′, the other being connected with the hollow piston-rod E, through which the water from the main passes, as shown by the arrows in Fig. 1. *m*, *n*, *p*, and *q* are puppet-valves on the valve-stems *d*, which are connected together by yokes *c*, on the upper surfaces of which elastic cushions, or spiral or other shaped springs, are applied.

*a′* is a rod or bolt, slotted at its upper end for the reception of a lever, connected by suitable mechanism with a dial or indicator. The lower end of the rod *a′* is headed and encircled by a spiral spring bearing against the upper face of the bolt-head at its lower end, its upper end bearing against the lower face of the cylinder-head B. In the upward movement of the piston it strikes the head of the rod *a′*, and causes a registration on the dial or indicator, and gives a similar indication or registration in the backward movement of the piston by the reaction of the spring.

The operation of my reciprocating water-meter is as follows: Water is introduced from the supply-pipe into the stuffing-box C, and passes thence, through the hollow piston-rod E, into one of the compartments in the hollow piston, and thence out of said piston into the lower part of the cylinder below the piston, the latter being supposed to move from the bottom of the cylinder A upward. Under this supposition the water above the piston D in the cylinder A is forced through the valve *m* into the interior of the piston D on opposite sides, and thence out through the hollow piston-rod E′, as indicated by the arrows, and at the same time the water enters the hollow piston through the upper end of the hollow rod E, and thence passes out through the valve *q* into the space below the piston until the elastic cushion or spring above the piston is compressed between the boss *a* on the inside of the head B and the yoke *c*, that connects the valves *m* and *p*. This action of the spring *b b* closes the valves *m* and *q*, and opens the valves *n* and *p*. This movement of the valves reverses the direction of the movement of the piston D, which begins to descend. The water then passes from the cylinder below the piston up through the valve *n*, and thence out through the hollow rod E′, as indicated by the arrows in Fig. 1, and at the same time the water from the upper part of the hollow rod E passes into the interior of the piston, and thence out through the valve *p* into the upper portion of the cylinder A. A reciprocating movement is thus given the piston in the cylinder, a registration on the dial being made at every stroke of the piston.

Having thus described my invention, what I claim as new is—

1. The combination of springs or elastic cushions with the valves in a reciprocating piston, for the purpose of adjusting or setting them at each stroke of the piston.

2. The combination of springs or elastic cushions with the hollow piston-rods, the hollow piston, and the puppet-valves in the piston.

3. The combination of springs or elastic cushions with the cylinder and the piston-valves, for the purpose of compressing the springs to set the valves by the movement of the piston.

4. The two sets of piston-valves, connected to each other to insure their simultaneous movement in or through the piston.

5. The hollow piston D, having the diaphragm *g*, and valves *m*, *n*, *p*, and *q* on the valve-stems *d d*, connected by the yokes *c c*, substantially as described, for the purpose set forth.

6. The hollow piston D, constructed as set forth, in combination with the elastic cushions or springs *b b*, bearing on the yokes *c*, and counterbalancing the pressure of the water by reversing the valves, substantially as described, for the purpose specified.

7. The cylinder A, provided with the stuffing-box C, in combination with the hollow piston D, having the diaphragm *g*, and puppet valves, connected by yokes and springs *b b* substantially as described, and for the purpose set forth.

ANDREW BERGSTROM.

Witnesses:

HENRY M. WILLIAMSON,
ANDREAS UELAND.